US012614221B2

(12) United States Patent
Ramirez

(10) Patent No.: US 12,614,221 B2
(45) Date of Patent: Apr. 28, 2026

(54) SYSTEM AND METHODS FOR DETERMINING ENHANCED COUNTERS BASED ON INTEGRATING MERCHANT PROFILES

(71) Applicant: Capital One Services, LLC, McLean, VA (US)

(72) Inventor: Walker Ramirez, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 209 days.

(21) Appl. No.: 18/503,286

(22) Filed: Nov. 7, 2023

(65) Prior Publication Data

US 2025/0148520 A1     May 8, 2025

(51) Int. Cl.
*G06Q 30/00* (2023.01)
*G06Q 30/0283* (2023.01)
*G06Q 30/0601* (2023.01)

(52) U.S. Cl.
CPC ..... *G06Q 30/0631* (2013.01); *G06Q 30/0283* (2013.01); *G06Q 30/0641* (2013.01)

(58) Field of Classification Search
CPC ................................................ G06Q 30/0631
See application file for complete search history.

(56) References Cited

U.S. PATENT DOCUMENTS

| | | | |
|---|---|---|---|
| 5,774,883 A | 6/1998 | Andersen et al. | |
| 7,908,210 B2 | 3/2011 | Huber et al. | |
| 8,560,438 B2 | 10/2013 | Hankey et al. | |
| 10,387,951 B2 | 8/2019 | Scopazzi | |
| 10,438,256 B2 | 10/2019 | Wollmer et al. | |
| 2010/0088238 A1* | 4/2010 | Butterfield | G06Q 50/188 |
| | | | 705/26.1 |
| 2015/0120489 A1 | 4/2015 | Edelman | |
| 2017/0161825 A1* | 6/2017 | Nair | G06Q 40/03 |
| 2019/0139134 A1 | 5/2019 | Wickett | |
| 2019/0295143 A1* | 9/2019 | Ng | G06Q 30/0282 |
| 2019/0362374 A1* | 11/2019 | Mungoli | G06Q 30/0223 |
| 2021/0027317 A1 | 1/2021 | Baghestani et al. | |

OTHER PUBLICATIONS

Yanbin, Peng, and Zheng Zhijun. "Automated Negotiation Based on Ensemble Learning and Optimal Counter Proposal."*

* cited by examiner

*Primary Examiner* — Kathleen Palavecino

(74) *Attorney, Agent, or Firm* — Sterne, Kessler, Goldstein & Fox P.L.L.C.

(57)     ABSTRACT

A system and method for generating enhanced counter offers is disclosed. The system and method can generate, for a merchant, a list of alternative inventory items to a given item. A plurality of historic deal metrics based on past financing terms for each of the alternative inventory items may be determined. An alternative sale price based on applying the plurality of historic deal metrics to a merchant listed sale price for the given item may be generated. A report based on the alternative sale price may be generated. The report may be transmitted to the client device for display on an interactive graphical user interface (GUI).

15 Claims, 5 Drawing Sheets

200

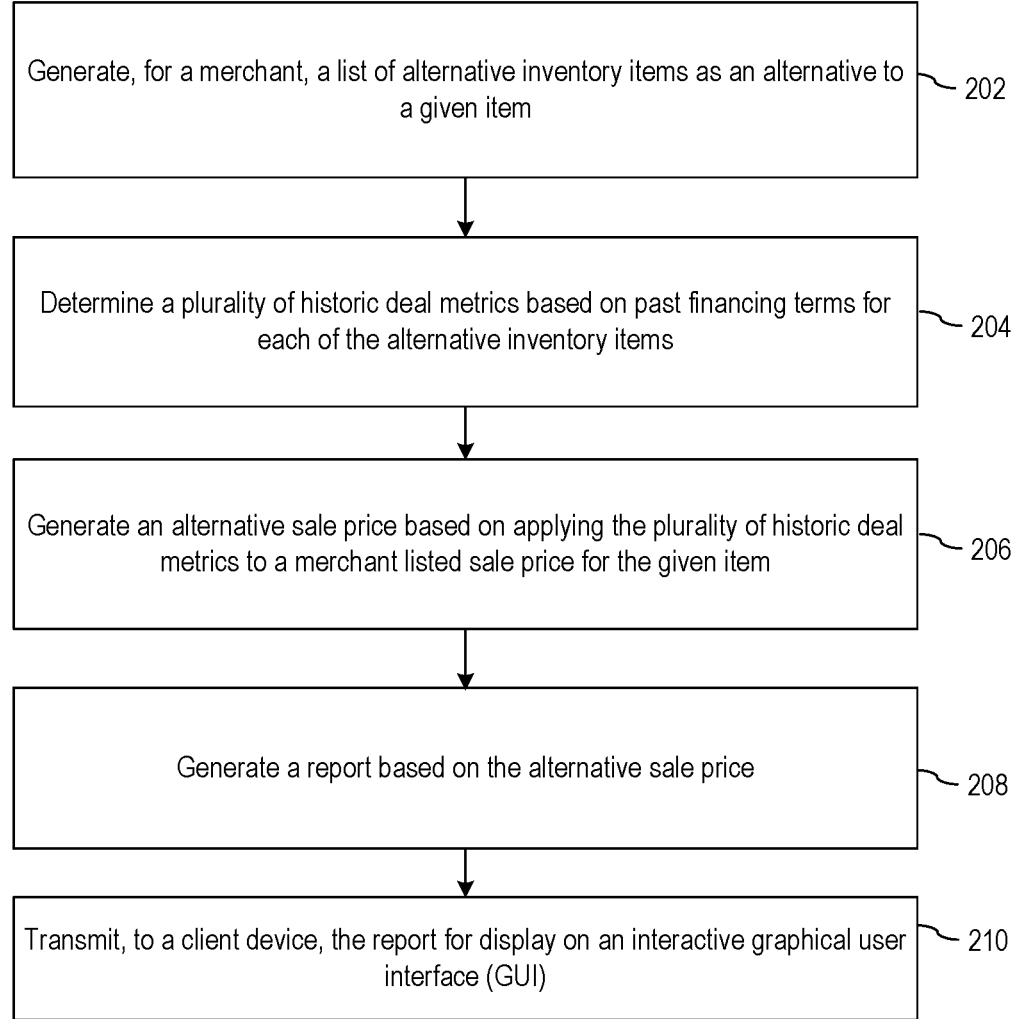

Generate, for a merchant, a list of alternative inventory items as an alternative to a given item — 202

Determine a plurality of historic deal metrics based on past financing terms for each of the alternative inventory items — 204

Generate an alternative sale price based on applying the plurality of historic deal metrics to a merchant listed sale price for the given item — 206

Generate a report based on the alternative sale price — 208

Transmit, to a client device, the report for display on an interactive graphical user interface (GUI) — 210

SYSTEM AND METHODS FOR DETERMINING ENHANCED COUNTERS BASED ON INTEGRATING MERCHANT PROFILES

TECHNICAL FIELD

Aspects relate to systems and methods for enhanced merchant-lender computing systems.

BACKGROUND

When a customer is approved for financing to purchase an item (e.g., a vehicle, a luxury good, etc.) but the submitted financing structure is unacceptable to a lender, the lender will typically issue a counter offer to the customer and/or a merchant from which the customer is purchasing the item. These counter offers are typically generated automatically using computer implemented systems and business rules, and are typically generated based on univariate adjustments to sales price and/or cash down in order to get the submitted structure within the lender's acceptable credit policy. These offers are often generated without any historical knowledge of the merchant or customer's past dealings.

One limitation of this approach is that the lender may generate high dollar amount counters that are often unlikely to be funded because neither the customer or merchant are willing (or able) to pay a down payment countered at, take a loan rate proposed, etc. Thus, lenders can miss deals, which results in lost revenue. For example, if a lender requires thousands more dollars for a down payment from the customer or a reduction in sales price from the merchant, the customer or merchant might be unwilling or unable to pay the full amount. This process also often takes a lot of time, with lenders and merchants and/or customers going back and forth to come up with an optimal, in-budget financing structure.

Thus, systems and methods are needed to improve the process and to allow lenders the ability to provide highly targeted and custom counters so that a higher percentage of deals are funded.

SUMMARY

Aspects of this disclosure are directed to a system and methods for generating enhanced counter offers. The system and methods allow lenders to automatically generate highly targeted counter offers to merchants and/or customers for financing the purchase of an item (the item being a good or a service). The ability of the system to provide the highly targeted counter offers stems from the system being able to identify merchant and/or customer past deal information (also referred to herein as "historic deal metrics"), and analyzing that information with custom computer implemented business rules to derive an optimal counter offer. The system can analyze the historic deal metrics for equivalent and/or comparable items that have been financed through the merchant in past purchases. Based on applying predetermined business rules to the historic deal metrics, an alternative sale price, down payment, etc. may be generated that more closely reflects a price and terms that is acceptable to a merchant, customer, and lender to finance the purchase. In aspects, a report based on the alternative sale price or another field may be generated and transmitted to the merchant and/or customer for display on an interactive graphical user interface (GUI) of a client device. The report may be accessed by the merchant and/or customer via the interactive GUI.

The benefits of the system and methods over conventional systems is that it provides a much more targeted way for lenders to provide counter offers using merchant and/or customer historic deal metrics. This targeting increases the intelligence of merchant-lender systems to provide tailored deal terms. Thus, the system improves the intelligence of merchant-lender interactive computing systems involved in generating financing structures, and improves the ability to provide tailored financing structures. Rather than a one size fits all approach that treats customer preferences and the financial status of both the customer and merchant the same (i.e. how much the consumer can afford, and how much a merchant is willing to concede), this system provides a unique optimal solution for all parties involved.

The system and methods can also generate the financing structures in real-time from when an initial financing structure is received. Thus, an additional benefit of the system is that it has the ability to provide real-time optimal counter offers to merchants and/or customers. This improves the overall time it takes to generate financing structures for a set of vehicles, saving merchants, customers, and lenders time during the financing process.

In aspects, the system and methods can implement the above functionality by generating a list of alternative inventory items to a given item the customer wants to purchase. A plurality of historic deal metrics based on past financing terms for each of the alternative inventory items may be determined. An alternative sale price or other financing structure variable may be generated based on applying the plurality of historic deal metrics to a merchant listed sale price for the given item. The alternative sale price may be generated by: identifying a merchant listed sale price, identifying a percentage change to the merchant listed sale price, identifying a scaling factor, multiplying the percentage change to the merchant listed sale price and the scaling factor to obtain a first value, adding the first value to a value of one to obtain a second value, and multiplying the second value with the merchant listed sale price to obtain the alternative sale price. This method may be applied to any monetary field within the financing structure, including but not limited to sales price, cash down, warranty and guaranteed asset protection (GAP) products. In aspects, the system can generate a report based on the alternative sale price or financing structure variant and transmit the report to the merchant and/or customer for display on an interactive GUI.

In aspects, the system can filter the list of alternative inventory items prior to generating the alternative financing structure. The filtering can include filtering for only alternative inventory items where the historic deal metrics indicate that a difference between a final sale price and the merchant listed sale price is below a predetermined threshold value. Such filtering can identify the deals that are appealing to—and thus likely to be accepted by—the merchant. In aspects, the system can receive the merchant listed sale price via the interactive GUI. The system can also generate the alternative sale price in real-time from when the merchant listed sale price is received.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the art to make and use the aspects.

FIG. 2 is an example method of operating the system to generate enhanced counter offers according to aspects.

In the drawings, like reference numbers generally indicate identical or similar elements. Additionally, generally, the left-most digit(s) of a reference number identifies the drawing in which the reference number first appears.

DETAILED DESCRIPTION

Figure 1:
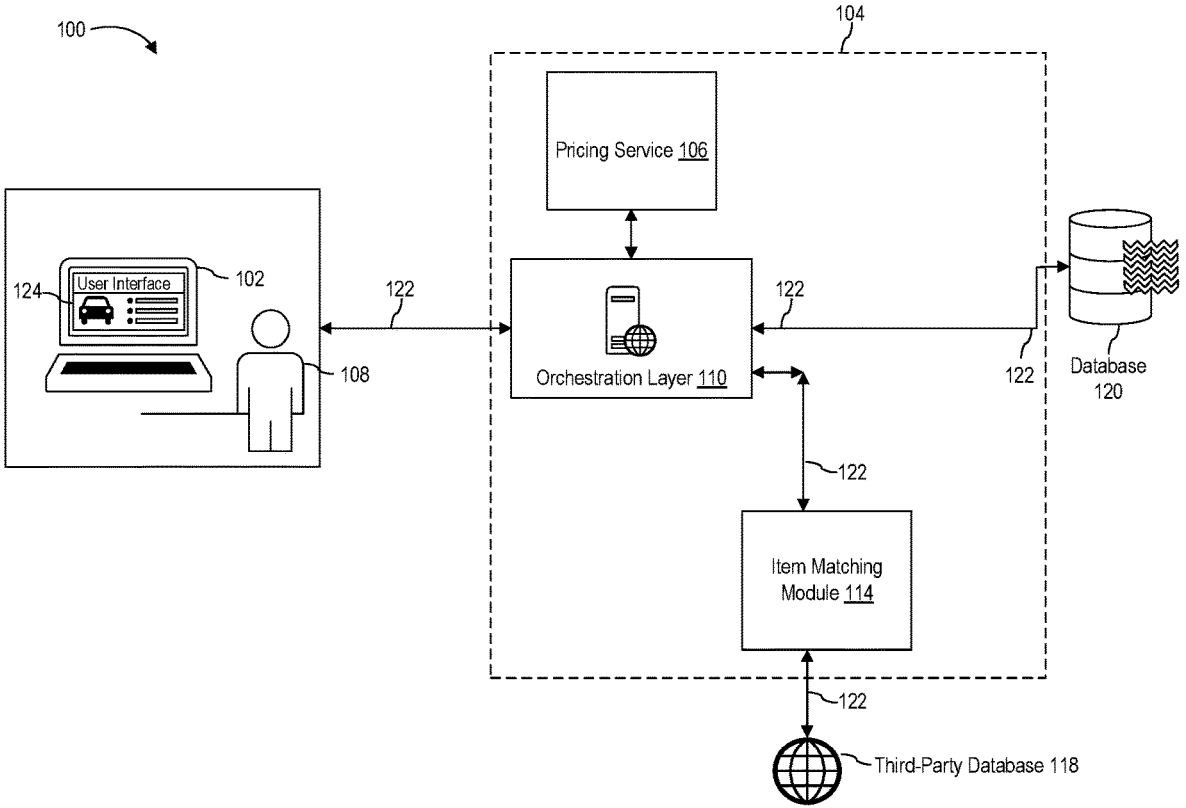
FIG. 1 is an example system for generating enhanced counter offers according to aspects.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Certain aspects have other steps or elements in addition to or in place of those mentioned. The steps or elements will become apparent to those skilled in the art from a reading of the following detailed description when taken with reference to the accompanying drawings.

System Overview and Function

FIG. 1 is an example system 100 for generating enhanced counter offers according to aspects. The enhanced counter offers (or simply "counter offers" or a "counter offer") refer to suggested financing terms and conditions that are likely to be acceptable to a customer 108, a merchant, and a lender when the customer 108 wants to finance the purchase of an item. The counter offers may be generated by a lender using the system 100. The lender may be, for example, a bank, credit union, or other financial institution that can facilitate the financing of the purchase. In aspects, the system 100 can be used when purchasing a vehicle. The remainder of the disclosure will discuss the system 100 with respect to purchasing a vehicle. However, this is exemplary and other items can be purchased using the system 100.

Counter offers can be generated by the system 100 when a given vehicle financing structure—while agreed on by the merchant and customer 108—does not fall within the lender's guidelines for extending a line of credit. Such guidelines are created to limit both a lender's and customer's 108 risk of defaulting. By way of non-limiting example, a lender may counter the structure approved by both the merchant and customer 108 because the structure does not contain enough cash down—which limits the moral hazard in defaulting on a financial product.

In aspects, the system 100 may be implemented on a server 104 of the lender. The server 104 may be a variety of centralized or decentralized computing devices. For example, the server 104 may be a mobile device, a laptop computer, a desktop computer, grid-computing resources, a virtualized computing resource, cloud-computing resources, peer-to-peer distributed computing devices, a server farm, or a combination thereof. The cloud-computing resources may be part of a cloud-computing environment. The cloud-computing environment may be a public or private cloud service. Examples of a public cloud include Amazon Web Services (AWS), IBM Cloud, Oracle Cloud Solutions, Microsoft Azure Cloud, and Google Cloud, as examples. A private cloud refers to a cloud environment similar to a public cloud with the exception that it is operated solely for a single organization.

The server 104 may be centralized in a single room, distributed across different rooms, distributed across different geographic locations, or embedded within a network 122. The server can encompass one or more computing devices that are meant to work together or in conjunction to perform some or all of the functions of the system 100. In aspects, the server 104 can couple with the network 122 to communicate with other devices, such as a client device 102. While the server 104 can couple with the network 122 to communicate with other devices (for example the client device 102), the server 104 can also be a stand-alone device.

The client device 102 may be any of a variety of devices, such as a user mobile device, for example a smart phone, a cellular phone, a personal digital assistant, a tablet computer, a notebook computer, a laptop computer, etc., or may be a desktop computer. The client device 102 can either couple, directly or indirectly, to the network 122 to communicate with the server 104 or may be a stand-alone device.

In aspects, the client device 102 may be a computer of the merchant and/or the customer 108 that may be used when purchasing the item. For example, the client device 102 may be used to communicate the intent to purchase the item to a lender. Thus, the client device 102 can couple to the server 104 via the network 122 to communicate that the customer 108 is interested in purchasing the item and needs financing.

In aspects, using the client device 102, an offer may be input and/or transmitted to a lender for the financing of the item. The offer can include a merchant listed price for the item, the amount needed to be financed, down payment information, etc., that the merchant and/or the customer 108 is proposing as the basis for the financing. Based on the submitted offer, the lender can accept, reject, or generate a counter offer with acceptable financing terms to the lender. How the system 100 facilitates the generation of the counter offer will be discussed further below.

The network 122 refers to a telecommunications network, such as a wired or wireless network. The network 122 can span and represent a variety of networks and network topologies. For example, the network 122 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 122. Cable, Ethernet, digital subscriber line (DSL), fiber optic lines, fiber to the home (FTTH), and plain old telephone service (POTS) are examples of wired communication that may be included in the network 122. Further, the network 122 can traverse a number of topologies and distances. For example, the network 122 can include a direct connection, personal area network (PAN), local area network (LAN), metropolitan area network (MAN), wide area network (WAN), or a combination thereof.

For illustrative purposes, in FIG. 1, the server 104 and the client device 102 are shown as endpoints of the network 122. This, however, is exemplary and it is understood that there may be different partitions between the server 104, the client device 102, and the network 122. For example, the server 104 and the client device 102 may be implemented to function as part of the network 122.

In aspects, the system 100 can include modules and/or services to perform some or all of its functionality. The modules and/or services can include, an orchestration layer 110, an item matching module 114, and a pricing service 106. The modules and how they facilitate the operation of the system 100 will be discussed further below.

Some or all of the modules may be implemented on any of the devices of the system 100. In the aspect shown in FIG. 1, all of the modules are shown as being implemented on the server 104. This, however, is exemplary and in other aspects, some or all of the modules may be implemented on the client device 102.

With respect to the process by which the system 100 generates the counter offers, in aspects, and as shown in FIG. 1, the system 100 may begin its operation by receiving, via an application installed on the client device 102, an offer by the merchant and/or the customer 108 with merchant and/or customer 108 offered terms for financing the item. As indicated, the terms can include a merchant listed sale price for the item, the amount needed to be financed, the amount of down payment the customer 108 is willing to make, any merchant discounts or promotional amounts to deduct from the sale price, etc. Based on the offered terms the lender can accept, reject, or generate the counter offer for financing the item.

The application refers to a software application or computer program. In aspects, if the client device 102 is a mobile device, the application may be analogous to a mobile application (also referred to as a "mobile app.") installed on the client device 102, from which a customer can interact with the modules of the system 100. If the client device 102 is a notebook computer or desktop computer the application may be a desktop application. In other aspects, the application may be installed on or accessed from a browser of the client device 102 as an applet, widget, or plugin. The application can also be implemented partially on the client device 102 and the server 104 using client-server architectures.

In aspects, the application can serve as a platform that connects the customer 108, merchants, and lenders. An example, of the application may be a platform such as Capital One's Auto Navigator™ platform, where merchants can list cars for sale, a customer 108 can search for cars to purchase and prequalify for financing, and a lender (e.g., a bank) can finance the purchase. While the aforementioned platform is an example of what the application may be, this is not meant to be limiting. Other similar platforms may be implemented as the application.

In aspects, the application can have an interactive GUI 124 from which the merchant and/or customer 108 can input terms of the offer. These terms may be input manually or sent to the lender based on pre-populated fields. The pre-populated fields may be supplemented by customer 108 and/or merchant specific terms that may be entered manually. For example, the terms can include a merchant listed price for the item, which may be fixed, but can also include fields where the customer 108 can input down payment amounts in a box or give a range via a slideable graphic or other similar user interface, that the customer is willing to pay. Other inputs/fields can include inputs/fields for merchants to enter promotional prices, discounts, etc.

In aspects, the application can be coupled to the modules and/or services of the server 104 via an application programming interface (API). In this way, the inputs and terms provided by the customer 108 and/or the merchant may be communicated, via the API, with the server 104 and its modules. The modules and/or services can process the inputs and determine what action should be taken based on the offered terms (e.g., reject, accept, or generate a counter offer).

In aspects, the customer 108 and/or merchant offered terms may be received by the orchestration layer 110. The orchestration layer 110 refers to a service of the system 100 that can serve as an entry point for the customer 108 and/or merchant offered terms. The orchestration layer 110 can also coordinate information transmission and retrieval to modules and services of the system 100, and perform task allocations for the system 100. For example, the orchestration layer 110 can comprise one or more software applications, programs, or lines of code that when executed by a processor can implement instructions that facilitate information transmission and retrieval to and/or between the modules of the system 100, and can coordinate execution of the modules.

In aspects, once the customer 108 and/or merchant terms are received at the orchestration layer 110, the orchestration layer 110 can, based on the information received, identify the item and the merchant from which the item is being purchased from. This may be done by, for example, analyzing the information provided as part of the terms to identify the item and merchant. For the purposes of this disclosure, it is assumed that information identifying the item and the merchant are provided as part of the terms provided by the merchant and/or customer 108.

In aspects, the orchestration layer 110 can apply the terms of the offer to a series of business rules to determine initially whether to reject, accept, or generate a counter offer for the financing request. For example, if the terms of the offer are outside an acceptable range of down payment, an interest rate, etc., based on the vehicle's mileage, age, etc., that the lender is willing to accept, the orchestration layer 110, based on applying the business rules, can reject the offer. The lender can also reject the offer if the customer 108 fails to meet certain criteria for creditworthiness. In other aspects, if the offer is within an acceptable range of down payment, interest rate, etc. that the lender is willing to accept, the orchestration layer 110, based on applying the business rules, can accept the offer as submitted without stipulating any changes. In aspects, if the offer is rejected, the orchestration layer 110 may invoke a process by which to generate a counter offer. This may not always be the case, however, if the customer 108 is deemed too risky to make a counter offer to. This may occur if the customer 108 has too many delinquent payments, repossessions, etc. The system 100 can check this to be the case by performing a credit check or other database records indicating such parameters. However, assuming that the customer 108 is not too risky to make a counter offer to, the system 100 can generate a counter offer. If, for example, the submitted financing structure is rejected based on customer 108's creditworthiness, a counter offer may be generated with increased down payment terms, higher interest rates, etc. If the submitted financing structure is rejected because the vehicle does not meet the lender's requirements (e.g., the vehicle has too many miles or is too old—both hurting the lender's ability to recover losses should a customer 108 default), the counter offer may increase the down payment terms, increase interest rates, etc. Additionally and alternatively, the lender may decide to reject the desired vehicle no matter the terms and request that the customer switch to an alternative inventory item should they want to proceed with financing. Related to the financing structure, if the monthly payment for the given financing structure is deemed too high for the customer 108 (because it reduces the customer 108 disposable income and increases the risk of default or charge off by the customer 108), the counter offer may reduce the payments by adding additional equity (as percent of amount financed) to the deal. This can be accomplished by the merchant lowering sales prices and/or customer 108 increasing cash down. The remainder of the discussion with respect to the aspects discusses how the system 100 generates the counter offer.

In aspects, once the offer is rejected, to begin generating the counter offer, the orchestration layer 110 can call the item matching module 114 to generate a list of alternative inventory items to the item identified. The item matching module 114 can enable generating a list of alternative inventory items to the identified item. The alternative inventory items can comprise both the exact same item type that the customer wishes to purchase or items similar to the item in classification type, features, category, etc. The item matching module 114 can generate the list of alternative inventory items by implementing the system, methods, and processes disclosed in U.S. patent application Ser. No. 17/104,684, filed on Nov. 25, 2020, entitled "MATCHING INVENTORY CHARACTERISTICS AND STRUCTURE," and issued as U.S. Pat. No. 11,436,561, the contents of which is incorporated by reference herein in its entirety.

The purpose of generating the list of alternative inventory items is to gather a list of similar items to the item the customer 108 wants to purchase that requires the fewest changes to the initially agreed upon structure and thus reducing the intensity or amount of the counter for the initially submitted financing structure. Additionally and alternatively, this list of similar items may adjust a parameter of the vehicle-financing structure that was the cause of the lender countering the structure agreed upon by the merchant and consumer 108. For example if the initially submitted vehicle violated the age of vehicles that the lender extends financing offers for, similar items may include vehicles newer in age that would be acceptable by all parties. Likewise, if the counter offer was a result of the initially submitted vehicle's sales price, or any metric calculated from sales price (e.g., amount to finance, payment to income, etc.), similar items may include vehicles with a lower sales price as a result of intrinsic vehicle properties (e.g., a trim with fewer non-standard options and thus a lower sales price), dealer costs, or manufacturer rebates and incentives, or the like. Related to dealer costs, a dealer may assign a cost to having a vehicle sitting on their lot for long periods of time and thus may be willing to offer the customer 108 a better deal—relative to the initially submitted vehicle—by lowering sales prices by a higher proportion.

Manufacturers may incentivize dealer's to push for the sale of certain models through rebates or the like that allow greater flexibility in negotiating for the dealer (e.g. clearing the current model years as the new ones come on the lot). After identifying a subset of similar items, a pool of data related to historic deal metrics for those items are created. The historic deal metrics are used by the system 100 to generate a counter offer structure by having the system 100 process the historic deal metrics to determine what deal terms (e.g. cash down, sales price, etc.) were acceptable in the past to the merchant for the similar items. From the determination, a counter offer may be generated that is likely to be acceptable to both the customer 108, the merchant, and the lender. Additionally, such historic deal metrics may inform the mechanism by which similar vehicles are identified. For example, analyzing these metrics may identify that a customer 108 and dealer that initially submit a Toyota Camry XLE (the highest level of trim) to the lender, may finance a Toyota Camry SE (a lower trim, and thus lower sales price) at the end of the transaction.

In aspects, the item matching module 114 can generate the list of alternative inventory items to the item based on accessing a third-party database 118. The third-party database 118 can contain product information (e.g. each vehicle's make, model, year, trim, mileage, miles per gallon (MPG), key features, etc.,) that may be used to generate the list of alternative inventory items. In aspects, the third-party database 118 may be managed by a third-party vendor, which is external and independent of the company or institution implementing the system 100. Such databases may be accessed by consumer, dealer, or lender through one or more user interfaces hosted by the third-party via mobile application or website or via separate GUI that accesses said information via an API.

By way of example, if the customer 108 wants to purchase a car using the application, the list of alternative inventory items can comprise cars that are similar or the same as the car in terms of make, model, body style, vehicle category, features, etc. that were the subject of past sales by the merchant. In aspects, the list of alternative inventory items and the associated information for those alternative inventory items may be saved in a computer file, such as a text file or as entries in a database by the item matching module 114.

In aspects, once the item matching module 114 generates the list of alternative inventory items, control and the list of alternative inventory items may be passed back to the orchestration layer 110. In aspects, the orchestration layer 110 can enable determining a plurality of historic deal metrics based on past financing terms for both a merchant selling the item and for customers that are financially similarly situated as the customer 108 wanting to purchase the item. This is done by retrieving past deal information for each of the items listed in the list of alternative inventory items. For example, the historic deal metrics for a merchant can include, for each of the alternative items in the list of alternative inventory items, a sales price that that item sold for, the financing terms for that sale, any discounts applied, any credits given, down payment amounts accepted, etc. In aspects, the historic deal metrics for the merchant can also be analyzed in the aggregate and further metrics may be derived from them. For example, metrics may be derived indicating what the average percent change the merchant is willing to discount the item based on past deals done, what the average down payment is that the customer is willing to pay for the item, etc.

The historic deal metrics for customers can include, for each of the alternative items in the list of alternative inventory items, a sales price that was accepted for that item, the financing terms for that item, any down payments made, the credit score of that customer that purchased the alternative inventory item, account balances of that customer, monthly income range of that customer, etc. The aforementioned are exemplary metrics that may be included as part of the historic deal metrics. A person of ordinary skill in the art (POSA) will recognize other metrics that may be used, and that relate to the purchasing and/or financing of items depending on the item purchased.

In aspects, the historic deal metrics may be obtained from a database 120. The database 120 refers to one or more databases or repositories that the system 100 has access to and that store the historic deal metrics. For example, historic deal metrics for the merchant may be obtained from a merchant database that stores the historic deal metrics. In aspects, the historic deal metrics for a merchant may be provided as part of a merchant profile, which may be a data structure or a computer file listing the past historic deal metrics for a merchant. In aspects, the historic deal metrics may be based on past deals that were financed through the company or institution implementing the system 100. For example, in the aspect where the company implementing the system 100 is a bank, the historic deal metrics for the merchant may be based on purchases made and/or financed through the bank, which may be stored in databases or repositories of the bank. In some aspects, the historic deal metrics may be obtained from the merchants directly, by having the merchants voluntarily provide the information and/or access to a database via APIs and database programs that have the information.

Similarly, the historic deal metrics for the customers may be obtained from the database 120. The historic deal metrics for the customers may be based on past deals that were financed through the company or institution implementing the system 100. Alternatively or in conjunction, the information may be obtained by accessing databases for credit agencies, partner institutions, merchants, etc., to obtain information about past purchases for the alternative inventory items.

In aspects, in addition to obtaining historic deal metrics for the merchant and customers that have purchased the same or similar items, the orchestration layer 110 can also obtain customer information about the customer 108 that is seeking to purchase the item.

In aspects, the customer information for the customer 108 wanting to purchase the item can include a credit score information, information regarding his or her bank account balances, monthly income range, etc., such that the financial circumstance and purchasing power of the customer 108 may be determined by the system 100. In aspects, the information about the customer 108 may be obtained from the same or a different database as that from which the other customer's information is obtained (e.g., the database 120). The purpose of obtaining the customer's 108 information is for the system 100 to be able to filter the plurality of the historic deal metrics based on the customer's 108 information, in order to identify only those customers that made past purchases that are similarly situated financially to the customer 108. In this way, past deal information for customers most closely resembling the customer 108 wanting to purchase the item is only analyzed by the system 100 to generate the counter offer.

In aspects, once the orchestration layer 110 obtains the plurality of historic deal metrics for the merchant, customers that have made past purchases, and the customer 108 wanting to purchase the item, the orchestration layer 110 can optionally perform the filtering on the historic deal metrics. This filtering, as indicated, can serve the purpose of removing any historic deal metrics for customers that are not financially similarly situated as the customer wanting to purchase the item. The filtering also allows the system 100 to process only a subset of data from that pulled from the various databases, thus reducing the amount of data processing performed by the system 100, and speeding up the computations of the system 100.

Various methods may be implemented to perform the filtering. For example, in aspects, the filtering can include filtering the historic deal metrics to include only historic deal metrics for customers within a banded credit risk profile as the customer 108. The banded credit risk profile refers to the customers being within a credit score of the customer 108 plus a predetermined threshold value. Thus, only information related to customers with the same or similar credit scores as the customer 108 is analyzed.

In aspects, the filtering can further include filtering the plurality of customer historic deal metrics to include only customer historic deal metrics for customers within a monthly income range as the customer 108. The aforementioned are exemplary ways to filter historic deal metrics to align customers who made past purchases with the customer 108. Other methods of filtering may be used based on other criteria and data that is pulled. In aspects, and alternatively, the orchestration layer 110 does not have to perform the filtering and can process all the historic deal metrics it retrieves.

In aspects, the filtering can also include filtering the historic deal metrics to a specific price point for the item. For example, a filtering may be done to filter the historic deal metrics where a difference between a final sale price and the merchant listed sale price is below a predetermined threshold value. In this way, data in specific price ranges may be isolated and used as a basis for generating the counter offer. In addition to a predetermined threshold on a specific value, application 100 may allow for customer 108, merchant, or lender to specify via one or more user interfaces the total number of vehicle financing structures to be returned. For example, the customer 108 or merchant may specify that they only want to see the top "N" vehicle-financing structures with the lowest change to the initially submitted down payment or sales price, where "N" is a whole number. As such, the similar inventory items can be sort-ordered by these metrics, with the top N selected and returned by the orchestration layer 110.

In aspects, once the historic deal metrics are retrieved (and optionally filtered), control and the historic deal metrics may be used by the orchestration layer 110 to generate an alternative sale price for the item. The alternative sale price refers to a lender generated counter sale price for the item. The alternative sale price is an alternative to the merchant listed sale price. The alternative sale price can determine at what price point the lender can finance the purchase, if they choose to offer financing at all at that alternative sale price. Based on the price point determined, further terms for the financing can also be determined.

In aspects, the alternative sale price may be determined based on applying some or all of the historic deal metrics to a merchant listed sale price for the item. For example, the alternative sale price may be determined based on equation (1) shown below:

$$O(i) = SP(i) * (1 + C_p(i) * \zeta(i)) \tag{1}$$

In equation (1), O(ι) represents the alternative sale price for the item i, SP(ι) is the merchant listed sale price for the item, $C_p(ι)$ is a percentage change to SP(ι) based on a lender counter price offer and historic deal metrics for the given merchant, and ζ(ι) is a scaling factor. ζ(ι) represents a weight that is used in equation (1) that reflects the intensity of the lender counter price offer and is a mechanism to share the counter value between the customer 108 and merchant. ζ(i) may be a positive value between 0 and 1, with a higher ζ(ι) indicating a larger counter offer. ζ(ι) may be customized by a designer of the system 100. How ζ(ι) is determined will be discussed further below.

In aspects, the value for $C_p(ι)$ may be determined based on equation (2) shown below:

$$C_p(i) = \max\left(a * \mu_j - b * \sigma_j,\ C(i)/SP(i)\right) \qquad (2)$$

In equation (2), a and b are any constants, $\mu_j$ is an average percent change in sales price for the merchant as determined based on the historic deal metrics where sales price decreases from the start to the end of the auto-buying process, $\sigma_j$ is a standard deviation for the average percent change in sales price for the merchant based on the historic deal metrics where sales price decreases from the start to the end of the auto-buying process, and C(ι) is the amount of the counter offer the lender provides. C(ι) is a quantity that represents the change to the original sales price that the lender requires to approve the consumer for financing. To increase equity in the deal as part of a counter offer, lenders require a reduction in sales price, thus this quantity C(ι) will be a negative number. SP(ι) is the same as defined in equation (1). In aspects, the value for ζ(ι) may be determined based on equation (3) shown below:

$$\zeta(i) = \min\left(a,\ \text{floor}\left(|C(i)|/\Delta\right)\right)/\alpha \qquad (3)$$

In equation (3), α is a scaling factor to scale ζ(ι) between 0 and 1, where there are α+1 buckets that a counter can fall into. C(ι) is the same value as in equation (2), and Δ is a size of a counter band. The counter band represents the dollar value range that the merchant listed sale price changes by based on the value of $C_p(ι)$. The ranges for Δ can also be customized by a designer of the system 100. By way of example, if the values for α=9 and Δ=1000, based on equation (3), values for ζ(ι) may be determined based on the following ranges shown in the Table A below:

TABLE A

Example ζ(i) values based on counter offer changes to the merchant listed sale price.

| Counter price change ($ dollar amount) | | |
|---|---|---|
| From | To | ζ(i) |
| $ 0 | $ 999 | 0 |
| $1000 | $1999 | 1/9 |
| $2000 | $2999 | 2/9 |
| $3000 | $3999 | 3/9 |
| $4000 | $4999 | 4/9 |
| $5000 | $5999 | 5/9 |
| $6000 | $6999 | 6/9 |
| $7000 | $7999 | 7/9 |

TABLE A-continued

Example ζ(i) values based on counter offer changes to the merchant listed sale price.

| Counter price change ($ dollar amount) | | |
|---|---|---|
| From | To | ζ(i) |
| $8000 | $8999 | 8/9 |
| $9000 | Greater than $9000 | 1 |

By way of example, and taking the values shown in Table A, if the merchant listed sale price for the item is $25,000 and a counter offer is made by the lender which discounts the merchant listed price by 40%, ζ(ι) can have a value of 1 because the price decrease to the merchant listed sale price is $10,000, which falls in the range from $9,000 to greater than $9,000. If, however a counter offer is made by the lender discounting the merchant listed sale price by 10%, ζ(ι) can have a value of 2/9 because the price decrease to the merchant listed sale price is $2,500, which falls in the range from $2,000 to $2,999. In aspects, once the equations (1)-(3) are applied, the pricing service 106 can obtain the alternative sale price. Based on the alternative sale price, the pricing service 106 can determine what other terms are acceptable to the lender. Thus, the determination of the alternative sale price can drive the other terms such as down payment amounts, interest rates, etc. that are acceptable to the lender. In aspects, these other terms are determined by applying the alternative sale price to a series of business rules, that can then determine the other terms. Once all the terms are determined, they can constitute the counter offer generated by the system 100.

In aspects, once the counter offer is generated, the counter offer and control may be passed back to the orchestration layer 110. In aspects, the orchestration layer 110 can generate a report based on the alternative sale price and other terms determined for the counter offer. The report can comprise a document or a formatted graphic or webpage listing the terms of the counter offer. In aspects, the report may be transmitted by the orchestration layer 110 to the client device 102 for display on the interactive GUI 124 of the application. The report may be displayed to either the customer 108 or the merchant to convey the counter offer for financing the item.

In aspects, the system 100 may be implemented as a real-time system such that the system 100 generates the counter offer in real-time from when the merchant listed sale price and other initial terms of the customer 108 and/or merchant offer are provided to the orchestration layer 110. Real-time refers to the system 100 generating the counter offer within milliseconds, seconds, or less from when the initial terms are received so that the counter offer is able to be transmitted to the client device 102 almost instantly from when the initial offer is submitted.

The modules described in FIG. 1 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It has been discovered that the system 100 described above improves the state of the art from conventional systems because it provides a novel way to generate highly targeted counter offers for financing an item. The system does this by taking into account historic deal metrics for both merchants and customers to generate counter offers for the submitted item and others identified in the merchant's inventory. The historic deal metrics may be used as a basis for targeting price points that are likely to be acceptable to merchants, lenders, and a customer 108 for financing the item. Specifically, by filtering the historic deal metrics to determine specific price points, previous deal terms of financially similarly situated customers as the customer 108, and determining merchant related metrics such as an average percent sale price change for the merchant and a standard deviation for the average percent sale price for the merchant, and applying the same to equations (1)-(3), the system 100 can determine highly targeted and tailored counter offers for the customer 108 and the merchant. The tailored counter offers may be based on data indicating what the merchant and/or customer 108 was willing to pay in the past and is based on firm boundaries of any financing terms in the past. The ability of the system 100 to provide these targeted counter offers significantly reduces time negotiating deal terms by leveraging technology and data in an intelligent manner to derive deal terms likely to be acceptable to all parties. Thus, by leveraging data intelligently the system 100 saves merchants, customers, and lenders time and money when purchasing items. This is because only terms may be generated that are known to be likely acceptable to all parties. In cases where a financing structure cannot be accepted by all three parties given the constraints of the initial inventory item, system 100 will recommend alternative similar items that are more likely to be accepted by all parties.

The system 100 also improves conventional systems by implementing an intelligent computer based system that can generate custom counter offers in real-time to merchants and customers. The counter offers may be generated almost instantly from the time the customer decides he or she wants to purchase an item. By providing a counter offer instantly, the system 100 can bypass hours or days of back and forth negotiations between customers, merchants, and lenders. Moreover, because the system 100 leverages historic deal metrics and other objective data points to generate its counter offer, all parties will know and may be confident that the terms of the counter offer presented are based actual deals performed in the past, and therefore all the metrics involved are based on past acceptable terms. This latter aspect also allows all parties to transact confidently, especially on the part of the customer, which can know that the counter offer presented is one where the financing terms are in line with other terms for other customers.

Methods of Operation

FIG. 2 is an example method 200 of operating the system 100 to generate enhanced counter offers according to aspects. Method 200 may be performed as a series of steps using system 100, for example, as described above. At step 202, the system 100 can generate for a merchant, a list of alternative inventory items to a given item. At step 204, a plurality of historic deal metrics based on past financing terms for each of the alternative inventory items may be determined. At step 206, the system 100 can generate an alternative sale price based on applying the plurality of historic deal metrics to a merchant listed sale price for the for each item identified in step 202. At step 208, a report based on the alternative sale price may be generated. At step

210, the report may be transmitted to the client device for display on an interactive graphical user interface (GUI).

Figure 3:
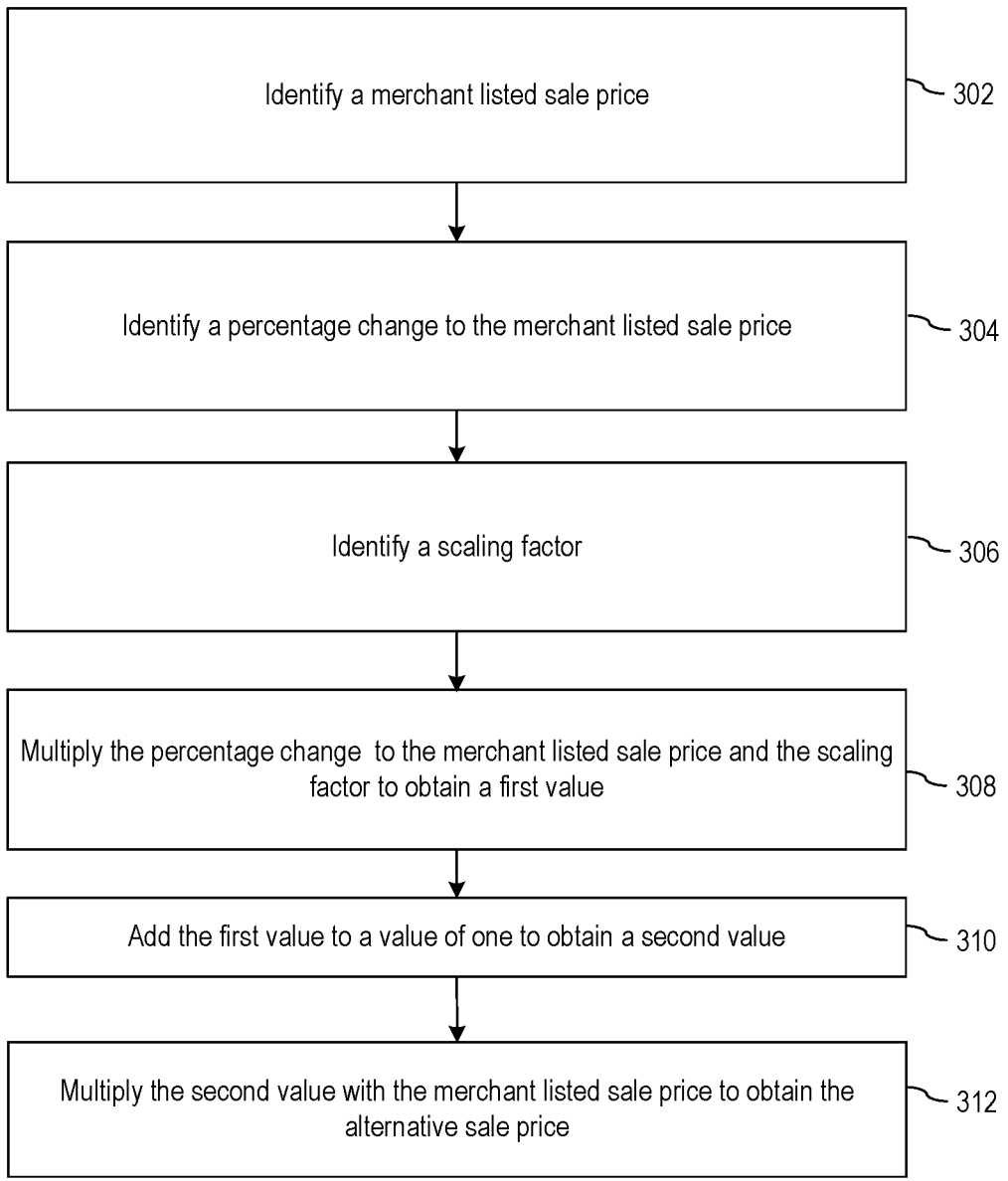
FIG. 3 is an example method of operating the system to generate an alternative sale price according to aspects.

FIG. 3 is an example method 300 of operating the system 100 to generate an alternative sale price for a single inventory item according to aspects. Method 300 may be performed as a series of steps. At step 302, the system 100 can identify a merchant listed sale price for a given inventory item. At step 304, a percent change to the merchant listed sale price may be identified that fulfills a lender's financing requirements. At step 306, a scaling factor may be identified. At step 308, the system 100 can multiply the percentage change to the merchant listed sale price and the scaling factor to obtain a first value. At step 310, the first value may be added to a value of one to obtain a second value. At step 312, the system 100 can multiply the second value with the merchant listed sale price to obtain the alternative sale price.

Further steps to determine the percentage change to the merchant listed sale price can comprise: identifying an average percent change in sale price for the merchant across historical transactions; identifying a standard deviation for the average percent change in sale price for the merchant across historical transactions; identifying a counter offer for the given item; multiplying a constant with the standard deviation to obtain a third value; subtracting the third value from the average percent change in sales price to obtain a fourth value; dividing the counter offer for the given item by the merchant listed sale price for the item to obtain a fifth value; determining which of the fourth value or the fifth value is greater; and setting the percentage change to the merchant listed sale price as the determined greater value.

Further steps to determine the scaling factor can comprise: identifying a maximum counter intensity value; identifying a counter offer for the given item; identifying a size of a counter band; dividing an absolute value of the counter offer for the given item by the size of the counter band to obtain a sixth value; determining a floor of the sixth value; determining which of the sixth value or the maximum counter intensity value is smaller; and setting the seventh value as the determined smaller value; dividing the seventh value by the maximum counter intensity value to set the scaling factor.

The operation of methods 200 and 300 are performed, for example, by system 100, in accordance with aspects described above.

GUI Interfaces of the System

Figure 4:
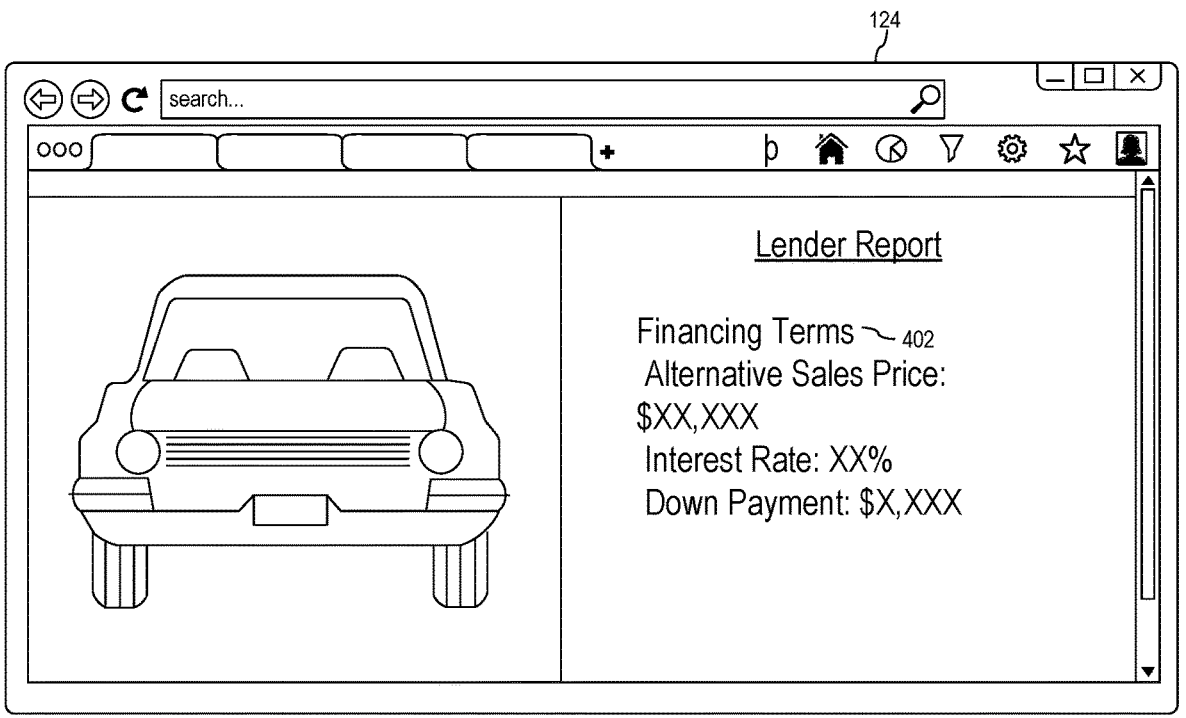
FIG. 4 is an example interactive graphical user interface (GUI) of the system for displaying the enhanced counter offers according to aspects.

FIG. 4 is an example interactive GUI 124 of the system 100 for displaying the enhanced counter offers according to aspects. In aspects, the interactive GUI 124 may be displayed on the client device 102, via the application. In aspects, what may be displayed on the interactive GUI 124 as part of the counter offer are financing terms 402. These can include the alternative sale price, the interest rate, and down payment amounts required for the financing. In aspects, other information may be displayed. For example, the item and/or information regarding the item can also be displayed. For example, if the customer 108 wants to purchase a car, a graphic of the car and/or a description of the features of the car can also be displayed in a window or pane of the interactive GUI 124. Additionally, alternative inventory items that are generated in step 202 may be displayed on GUI 124.

Components of the System

Figure 5:
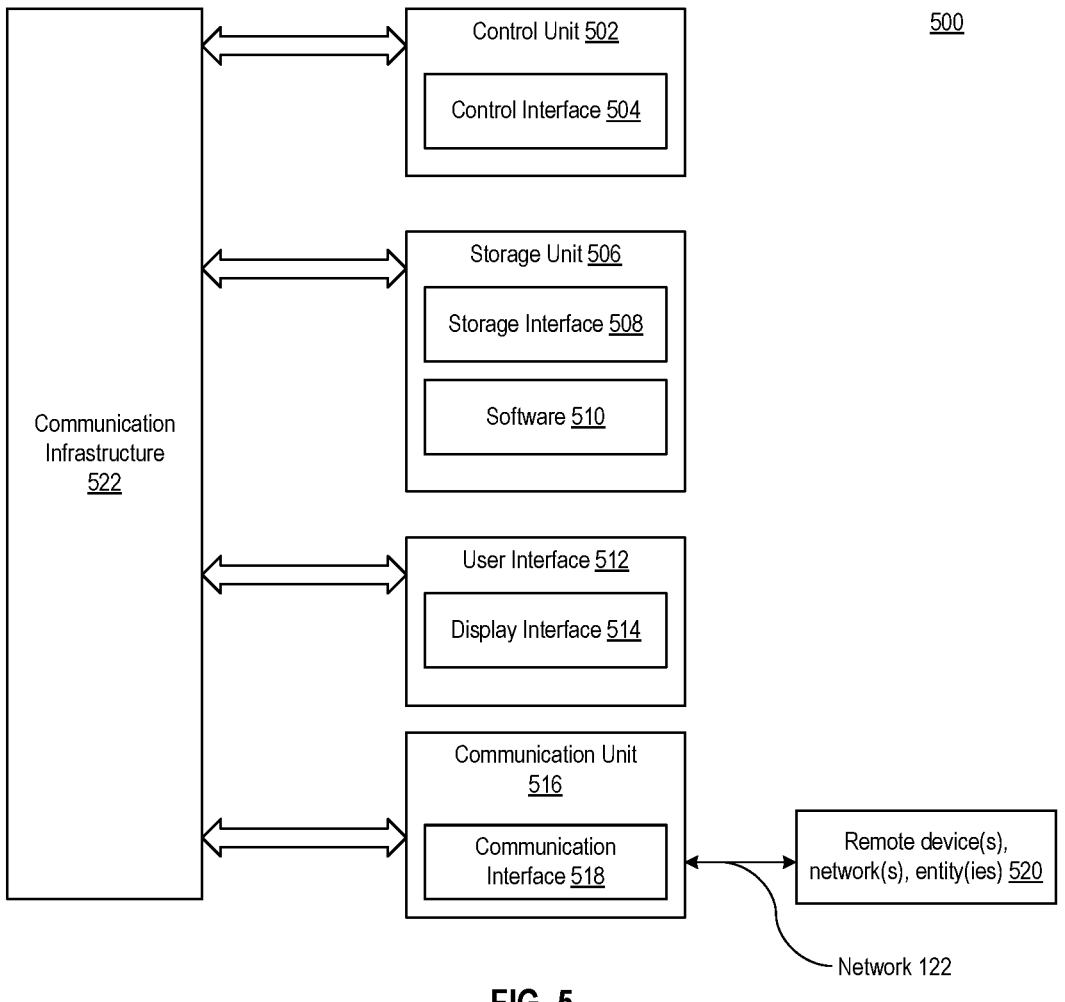
FIG. 5 is an example architecture of the components of the system according to aspects.

FIG. 5 is an example architecture 500 of the components of the system 100 according to aspects. The components may be the components of the server 104 on which the system 100 is implemented, or may be components of the client device 102. In aspects, the components may include a control unit 502, a storage unit 506, a communication unit 516, and a user interface 512. The control unit 502 may include a control interface 504. The control unit 502 may execute a software 510 to provide some or all of the intelligence of system 100. The control unit 502 may be implemented in a number of different ways. For example, the control unit 502 may be a processor, an application specific integrated circuit (ASIC), an embedded processor, a microprocessor, a hardware control logic, a hardware finite state machine (FSM), a digital signal processor (DSP), a field programmable gate array (FPGA), a graphics processing unit (GPU), or a combination thereof.

The control interface 504 may be used for communication between the control unit 502 and other functional units or devices of system 100. The control interface 504 may also be used for communication that is external to the functional units or devices of system 100. The control interface 504 may receive information from the functional units or devices of system 100, or from remote devices 520, for example the third-party database 118, or may transmit information to the functional units or devices of system 100, or to remote devices 520. The remote devices 520 refer to units or devices external to system 100.

The control interface 504 may be implemented in different ways and may include different implementations depending on which functional units or devices of system 100 or remote devices 520 are being interfaced with the control unit 502. For example, the control interface 504 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 504 may be connected to a communication infrastructure 522, such as a bus, to interface with the functional units or devices of system 100 or remote devices 520.

The storage unit 506 may store the software 510. For illustrative purposes, the storage unit 506 is shown as a single element, although it is understood that the storage unit 506 may be a distribution of storage elements. Also for illustrative purposes, the storage unit 506 is shown as a single hierarchy storage system, although it is understood that the storage unit 506 may be in a different configuration. For example, the storage unit 506 may be formed with different storage technologies forming a memory hierarchical system including different levels of caching, main memory, rotating media, or off-line storage. The storage unit 506 may be a volatile memory, a nonvolatile memory, an internal memory, an external memory, or a combination thereof. For example, the storage unit 506 may be a nonvolatile storage such as nonvolatile random access memory (NVRAM), Flash memory, disk storage, or a volatile storage such as static random access memory (SRAM) or dynamic random access memory (DRAM).

The storage unit 506 may include a storage interface 508. The storage interface 508 may be used for communication between the storage unit 506 and other functional units or devices of system 100. The storage interface 508 may also be used for communication that is external to system 100. The storage interface 508 may receive information from the other functional units or devices of system 100 or from remote devices 520, or may transmit information to the other functional units or devices of system 100 or to remote devices 520. The storage interface 508 may include different implementations depending on which functional units or devices of system 100 or remote devices 520 are being interfaced with the storage unit 506. The storage interface

508 may be implemented with technologies and techniques similar to the implementation of the control interface 504.

The communication unit 516 may enable communication to devices, components, modules, or units of system 100 or to remote devices 520. For example, the communication unit 516 may permit the system 100 to communicate between the server 104 on which the system 100 may be implemented, and the client device 102. The communication unit 516 may further permit the devices of system 100 to communicate with remote devices 520 such as an attachment, a peripheral device, or a combination thereof through the network 122.

As previously indicated, the network 122 may span and represent a variety of networks and network topologies. For example, the network 122 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 122. Cable, Ethernet, digital subscriber line (DSL), fiber optic lines, fiber to the home (FTTH), and plain old telephone service (POTS) are examples of wired communication that may be included in the network 122. Further, the network 122 may traverse a number of network topologies and distances. For example, the network 122 may include direct connection, personal area network (PAN), local area network (LAN), metropolitan area network (MAN), wide area network (WAN), or a combination thereof.

The communication unit 516 may also function as a communication hub allowing system 100 to function as part of the network 122 and not be limited to be an end point or terminal unit to the network 122. The communication unit 516 may include active and passive components, such as microelectronics or an antenna, for interaction with the network 122.

The communication unit 516 may include a communication interface 518. The communication interface 518 may be used for communication between the communication unit 516 and other functional units or devices of system 100 or to remote devices 520. The communication interface 518 may receive information from the other functional units or devices of system 100, or from remote devices 520, or may transmit information to the other functional units or devices of the system 100 or to remote devices 520. The communication interface 518 may include different implementations depending on which functional units or devices are being interfaced with the communication unit 516. The communication interface 518 may be implemented with technologies and techniques similar to the implementation of the control interface 504.

The user interface 512 may present information generated by system 100. In aspects, the user interface 512 allows users to interface with the system 100. In aspects, the user interface 512 can present the interactive GUI 124. The user interface 512 may include an input device and an output device. Examples of the input device of the user interface 512 may include a keypad, buttons, switches, touchpads, soft-keys, a keyboard, a mouse, or any combination thereof to provide data and communication inputs. Examples of the output device may include a display interface 514. The control unit 502 may operate the user interface 512 to present information generated by system 100. The control unit 502 may also execute the software 510 to present information generated by system 100, or to control other functional units of system 100. The display interface 514 may be a display, a projector, a video screen, or any combination thereof.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The terms "service" or "services" referred to herein can include a collection of modules or units. A collection of modules or units may be arranged, for example, in software or hardware libraries or development kits in an aspect of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface to facilitate the execution of functions of the system 100.

The modules, units, or services in the following description of the aspects may be coupled to one another as described or as shown. The coupling may be direct or indirect, without or with intervening items between coupled modules, units, or services. The coupling may be by physical contact or by communication between modules, units, or services.

The above detailed description and aspects of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods 200 and 300 and system 100 are cost-effective, highly versatile, and accurate, and may be implemented by adapting components for ready, efficient, and economical manufacturing, application, and utilization. Another important aspect of the present disclosure is that it valuably supports and services the historic trend of reducing costs, simplifying systems, and/or increasing performance.

These and other valuable aspects of the present disclosure consequently further the state of the technology to at least the next level. While the disclosed aspects have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer implemented method comprising:

receiving, by one or more computing devices and via input fields in an interactive graphical user interface (GUI) of an application installed on a client device, offered terms including a merchant listed sale price for a given item;

performing in real-time from when the offered terms are received:

generating, by the one or more computing devices and for a merchant, a list of alternative inventory items to the given item by accessing, via an application programming interface (API) coupled to a database storing product information, and generating a similarity score between the given item and a plurality of items based on the product information;

retrieving, by the one or more computing devices and via the API, a plurality of historic deal metrics based on past financing terms for each of the alternative inventory items;

generating, by the one or more computing devices, an alternative sale price based on applying the plurality of historic deal metrics to the merchant listed sale price for the given item, wherein the alternative sale price is generated by:

identifying the merchant listed sale price, identifying a percentage change to the merchant listed sale price, identifying a scaling factor, multiplying the percentage change with the merchant listed sale price and the scaling factor to obtain a first value, adding the first value to a value of one to obtain a second value, and multiplying the second value with the merchant listed sale price to obtain the alternative sale price;

generating, by the one or more computing devices, a report in the form of a formatted graphic listing the alternative sale price, a graphic of the given item, and product information related to the given item; and transmitting, by the one or more computing devices and to the client device, the report for display on the interactive GUI.

2. The method of claim 1, further comprising filtering, by the one or more computing devices, the list of alternative inventory items prior to generating the alternative sale price to include only alternative inventory items where the plurality of historic deal metrics indicate that a difference between a final sale price and the merchant listed sale price is below a predetermined threshold value.

3. The method of claim 1, further comprising generating the percentage change to the merchant listed sale price based on:

identifying, by the one or more computing devices, an average percent change in sale price for the merchant;

identifying, by the one or more computing devices, a standard deviation for the average percent change in sale price for the merchant;

identifying, by the one or more computing devices, a counter offer for the given item;

multiplying, by the one or more computing devices, a constant with the standard deviation to obtain a third value;

subtracting, by the one or more computing devices, the third value from the average percent change in sale price to obtain a fourth value;

dividing, by the one or more computing devices, the counter offer for the given item by the merchant listed sale price for the given item to obtain a fifth value;

determining, by the one or more computing devices, which of the fourth value or the fifth value is greater; and setting, by the one or more computing devices, the percentage change to the merchant listed sale price as the determined greater value.

4. The method of claim 1, further comprising generating the scaling factor based on:

identifying, by the one or more computing devices, a maximum counter intensity value;

identifying, by the one or more computing devices, a counter offer for the given item;

identifying, by the one or more computing devices, a size of a counter band;

dividing, by the one or more computing devices, an absolute value of the counter offer for the given item by the size of the counter band to obtain a sixth value;

determining a floor of the sixth value to obtain an integer seventh value;

determining, by the one or more computing devices, which of the seventh value or the maximum counter intensity value is smaller; and dividing the smaller value by the maximum counter intensity value to obtain the scaling factor.

5. The method of claim 1, wherein the method is implemented on devices of a cloud-computing environment.

6. A non-transitory computer readable medium including instructions that when executed by one or more processors of a computing system, cause the computing system to perform operations comprising:

receiving, via input fields in an interactive graphical user interface (GUI) of an application installed on a client device, offered terms including a merchant listed sale price for a given item;

performing in real-time from when the offered terms are received:

generating, for a merchant, a list of alternative inventory items to the given item by accessing, via an application programming interface (API) coupled to a database storing product information, and generating a similarity score between the given item and a plurality of items based on the product information;

retrieving, via the API, a plurality of historic deal metrics based on past financing terms for each of the alternative inventory items;

generating an alternative sale price based on applying the plurality of historic deal metrics to the merchant listed sale price for the given item, wherein the alternative sale price is generated by:

identifying the merchant listed sale price, identifying a percentage change to the merchant listed sale price, identifying a scaling factor, multiplying the percentage change with the merchant listed sale price and the scaling factor to obtain a first value, adding the first value to a value of one to obtain a second value, and multiplying the second value with the merchant listed sale price to obtain the alternative sale price;

generating a report in the form of a formatted graphic listing the alternative sale price, a graphic of the given item, and product information related to the given item; and transmitting, by the one or more computing devices and to the client device, the report for display on the interactive GUI.

7. The non-transitory computer readable medium of claim 6, wherein the operations further comprise filtering the list of alternative inventory items prior to generating the alternative sale price to include only alternative inventory items where the plurality of historic deal metrics indicate that a difference between a final sale price and the merchant listed sale price is below a predetermined threshold value.

8. The non-transitory computer readable medium of claim 6, wherein the operations further comprise generating the percentage change to the merchant listed sale price based on:

identifying an average percent change in sale price for the merchant;

identifying a standard deviation for the average percent change in sale price for the merchant;

identifying, by the one or more computing devices, a counter offer for the given item;

multiplying a constant with the standard deviation to obtain a third value;

subtracting the third value from the average percent change in sale price to obtain a fourth value;

dividing the counter offer for the given item by the merchant listed sale price for the given item to obtain a fifth value;

determining which of the fourth value or the fifth value is greater; and setting the percentage change to the merchant listed sale price as the determined greater value.

9. The non-transitory computer readable medium of claim 6, wherein the operations further comprise generating the scaling factor based on:

identifying a maximum counter intensity value;

identifying a counter offer for the given item;

identifying a size of a counter band;

dividing an absolute value of the counter offer for the given item by the size of the counter band to obtain a sixth value;

determining which of the sixth value or the maximum counter intensity value is smaller;

determining a floor of the sixth value to obtain an integer seventh value; and dividing the smaller value by the maximum counter intensity value to obtain the scaling factor.

10. The non-transitory computer readable medium of claim 6, wherein the non-transitory computer readable medium is implemented on devices of a cloud-computing environment.

11. A computing system comprising:

a memory storing instructions;

a processor coupled to the memory and configured to process the stored instructions to perform operations comprising:

receive, via input fields in an interactive graphical user interface (GUI) of an application installed on a client device, offered terms including a merchant listed sale price for a given item;

generate, for a merchant, a list of alternative inventory items to the given item by accessing, via an application programming interface (API) coupled to a database storing product information, and generating a similarity score between the given item and a plurality of items based on the product information;

retrieve, via the API, a plurality of historic deal metrics based on past financing terms for each of the alternative inventory items;

generate an alternative sale price based on applying the plurality of historic deal metrics to the merchant listed sale price for the given item, wherein the alternative sale price is generated by:

identifying the merchant listed sale price, identifying a percentage change to the merchant listed sale price, identifying a scaling factor, multiplying the percentage change with the merchant listed sale price and the scaling factor to obtain a first value, adding the first value to a value of one to obtain a second value, and multiplying the second value with the merchant listed sale price to obtain the alternative sale price;

generate a report in the form of a formatted graphic listing the alternative sale price, a graphic of the given item, and product information related to the given item; and a communication unit including microelectronics, coupled to the processor, configured to:

transmit, to the client device, the report for display on the interactive GUI.

12. The computing system of claim 11, wherein the control unitprocessor is further configured to filter the list of alternative inventory items prior to generating the alternative sale price to include only alternative inventory items where the plurality of historic deal metrics indicate that a difference between a final sale price and the merchant listed sale price is below a predetermined threshold value.

13. The computing system of claim 11, wherein the processor is further configured to generate the percentage change to the merchant listed sale price based on:

identifying an average percent change in sale price for the merchant;

identifying a standard deviation for the average percent change in sale price for the merchant;

identifying a counter offer for the given item;

multiplying a constant with the standard deviation to obtain a third value;

subtracting the third value from the average percent change in sale price to obtain a fourth value;

dividing the counter offer for the given item by the merchant listed sale price for the given item to obtain a fifth value;

determining which of the fourth value or the fifth value is greater; and setting the percentage change to the merchant listed sale price as the determined greater value.

14. The computing system of claim 11, wherein the processor is further configured to generate the scaling factor based on:

identifying a maximum counter intensity value;

identifying a counter offer for the given item;

identifying a size of a counter band;

dividing an absolute value of the counter offer for the given item by the size of the counter band to obtain a sixth value;

determining a floor of the sixth value to obtain a seventh value;

determining which of the seventh value or the maximum counter intensity value is smaller; and dividing the determined smaller value by the maximum counter intensity value to obtain the scaling factor.

15. The computing system of claim 11, wherein the computing system is implemented on devices of a cloud-computing environment.

* * * * *